(12) United States Patent
Ghulati

(10) Patent No.: US 11,526,675 B2
(45) Date of Patent: Dec. 13, 2022

(54) FACT CHECKING

(71) Applicant: Factmata Limited, London (GB)

(72) Inventor: Dhruv Ghulati, London (GB)

(73) Assignee: Factmata Ltd, London (GB)

( * ) Notice: Subject to any disclaimer, the term of this patent is extended or adjusted under 35 U.S.C. 154(b) by 142 days.

(21) Appl. No.: 16/643,567

(22) PCT Filed: Aug. 29, 2018

(86) PCT No.: PCT/GB2018/052438
§ 371 (c)(1),
(2) Date: Mar. 1, 2020

(87) PCT Pub. No.: WO2019/043379
PCT Pub. Date: Mar. 7, 2019

(65) Prior Publication Data
US 2020/0202073 A1   Jun. 25, 2020

Related U.S. Application Data

(60) Provisional application No. 62/551,357, filed on Aug. 29, 2017.

(30) Foreign Application Priority Data

Aug. 29, 2017 (GB) ...................... 1713817

(51) Int. Cl.
*G06F 40/30* (2020.01)
*G06F 40/205* (2020.01)

(52) U.S. Cl.
CPC ............ *G06F 40/30* (2020.01); *G06F 40/205* (2020.01)

(58) Field of Classification Search
CPC .... G06F 40/211; G06F 40/253; G06F 40/268; G06F 40/284; G06F 40/30; G06F 16/3344
See application file for complete search history.

(56) References Cited

U.S. PATENT DOCUMENTS 7,728,870 B2 * 6/2010 Rudnik ................. H04N 5/765
348/222.1
8,768,782 B1 * 7/2014 Myslinski ............. G06F 16/284
705/26.1

(Continued)

*Primary Examiner* — Lamont M Spooner
(74) *Attorney, Agent, or Firm* — Schwegman Lundberg & Woessner, P.A.

(57) ABSTRACT

The present invention relates to a method and system for verification scoring and automated fact checking. More particularly, the present invention relates to a combination of automated and assisted fact checking techniques to provide a verification score. According to a first aspect, there is a method of verifying input data, comprising the steps of: receiving one or more items of input data; determining one or more pieces of information to be verified from the or each item of input data; determining which of the one or more pieces of information are to be verified automatically and which of the one or more pieces of information require manual verification; determining an automated score indicative of the accuracy of the at least one piece of information which is to be verified automatically; and generating a combined verification score which gives a measure of confidence of the accuracy of the information which forms the or each item of input data.

19 Claims, 8 Drawing Sheets

(56) References Cited

U.S. PATENT DOCUMENTS

| | | | |
|---|---|---|---|
| 9,064,238 B2* | 6/2015 | Donoho | G06Q 40/02 |
| 9,643,722 B1* | 5/2017 | Myslinski | H04N 7/183 |
| 10,387,564 B2* | 8/2019 | Ananthanarayanan | ............... |
| | | | G06F 40/253 |
| 10,417,293 B2* | 9/2019 | Myslinski | G06F 16/3334 |
| 11,113,275 B2* | 9/2021 | Trummer | G06F 40/205 |
| 2006/0224445 A1* | 10/2006 | Axe | G06Q 30/02 |
| | | | 705/14.69 |
| 2007/0233672 A1* | 10/2007 | Sanfacon | G06F 16/9535 |
| | | | 707/999.005 |
| 2011/0125734 A1* | 5/2011 | Duboue | G09B 7/00 |
| | | | 707/723 |
| 2012/0005221 A1* | 1/2012 | Ickman | G06F 16/24575 |
| | | | 707/769 |
| 2013/0151240 A1* | 6/2013 | Myslinski | G06Q 30/02 |
| | | | 704/9 |
| 2013/0158984 A1* | 6/2013 | Myslinski | G06F 16/951 |
| | | | 704/9 |
| 2013/0159127 A1* | 6/2013 | Myslinski | G06Q 10/10 |
| | | | 705/26.1 |
| 2013/0198196 A1* | 8/2013 | Myslinski | G06Q 30/02 |
| | | | 707/758 |
| 2014/0164994 A1* | 6/2014 | Myslinski | G06F 3/04817 |
| | | | 715/808 |
| 2015/0057994 A1* | 2/2015 | Fang | G06F 40/253 |
| | | | 704/4 |
| 2015/0248736 A1* | 9/2015 | Myslinski | G06F 40/205 |
| | | | 705/319 |
| 2017/0195125 A1* | 7/2017 | Heppe | H04L 63/0823 |
| 2018/0068222 A1* | 3/2018 | Brennan | G06N 5/022 |
| 2018/0268305 A1* | 9/2018 | Dhondse | G06N 5/04 |
| 2019/0155900 A1* | 5/2019 | Ghotbi | G06N 20/00 |
| 2019/0179861 A1* | 6/2019 | Goldenstein | G06F 16/367 |

\* cited by examiner

FACT CHECKING

CROSS-REFERENCE TO RELATED APPLICATIONS

This Application is a U.S. Patent Application claiming the benefit of PCT International Application No. PCT/GB2018/052438, filed on Aug. 29, 2018 which claims the benefit of U. K. Provisional Application No. 1713817.3, filed on Aug. 29, 2017 and U.S. Provisional Application No. 62/551,357, filed on Aug. 29, 2017 all of which are incorporated in their entireties by this reference.

TECHNICAL FIELD

The present invention relates to a method and system for verification scoring and automated fact checking. More particularly, the present invention relates to a combination of automated and assisted fact checking techniques to provide a verification score

BACKGROUND

Owing to the increasing usage of the internet, and the ease of generating content on micro-blogging and social networks like Twitter and Facebook, articles and snippets of text are created on a daily basis at an ever-increasing rate. However, unlike more traditional publishing platforms like digital newspapers, micro-blogging platforms and other online publishing platforms allow a user to publicise their statements without a proper editorial or fact-checking process in place.

Writers on these platforms may not have expert knowledge, nor research the facts behind what they write, and currently there is no obligation to do so. Content is incentivised by catchiness and that which may earn most advertising click-throughs (content being optimised in this way sometimes being referred to as "clickbait"), rather than quality and informativeness.

Therefore, a large amount of content to which internet users are exposed may be at least partially false or exaggerated, but still shared/presented as though it were true.

Currently, the only way of verifying articles and statements made online is by having experts in the field of the subject matter either approve content once it is published or before it is published. This requires a significant number of reliable expert moderators to be on hand and approving content continuously, which is not feasible.

Existing methods/systems for automatically verifying content usually struggle in complex situations where there are a number of variables to be considered.

Additionally, existing methods/systems for verifying content which are not automated are unscalable, costly, and very labour-intensive.

SUMMARY OF THE INVENTION

Aspects and/or embodiments seek to provide a method of verifying and scoring input data by implementing automated and assisted fact checking techniques.

According to a first aspect, there is a method of verifying input data, comprising the steps of: receiving one or more items of input data; determining one or more pieces of information to be verified from the or each item of input data; determining which of the one or more pieces of information are to be verified automatically and which of the one or more pieces of information require manual verification; determining an automated score indicative of the accuracy of the at least one piece of information which is to be verified automatically; and generating a combined verification score which gives a measure of confidence of the accuracy of the information which forms the or each item of input data.

Such a method may verify input data automatically and/or semi-automatically and generate a verification score, or a "truth" score, that can combine automated content scoring and manual claim/statement checking.

Optionally, the step of receiving one or more input data comprises at least one of: automatically identifying input data to be verified; manual submission of information to be verified by a user; and obtaining reference information from one or more information channels.

In some instances, the input data may be received through a media monitoring engine. Input data may include media from Twitter, Facebook, blogging websites, and news articles, as well as sentences, articles or paragraphs submitted by a user or users.

Optionally, the reference information is gathered in dependence upon the one or more pieces of information to be verified.

The method may include (the use of) algorithms to automatically obtain reference information that is relevant to the pieces of information to be verified. The reference information may include facts that can be used to fact check particular claims/statements or articles. As an example, the reference information can be gathered from open knowledge databases of facts or data inputted directly/categorised/verified as factual information by a user or users.

Optionally, the method further comprises the use of natural language processing techniques and/or other computational methods.

For example, any article, statement or comment can contain a number of claims, or statements, which may need to be verified. Quantitative statements (e.g. the population of London is 12 million people) are generally easier to verify compared to qualitative statements (e.g. the population of London is generally less tolerant of delayed public transport), and techniques such as semantic parsing may be used to break up the incoming article/statement/comment (input data) and identify the various components of the data.

Optionally, the automated score is provided for information comprising any one of: a sentence, a paragraph, an article and/or a full news story.

The method may provide a score for the content in its entirety.

Optionally, the automated score comprises the use of at least one classifier modules to identify fake or misleading content. Optionally, the classifier modules comprise any one of: a clickbait detection module; a stance detection module; and content-density module and other modules as specified below. These classifier modules may be any type of generic supervised or unsupervised machine learning classifiers.

Optionally, the automated score comprises using natural language processing and/or other computational methods to provide a probabilistic score.

For example, this probabilistic score may be obtained without using reference information. Rather than verifying a fact against reference information, this method may provide a score using an arbitrary measure such as how much of a resemblance to, or appearance of being, clickbait a particular piece of content may be.

Optionally, the automated score is generated in accordance with weightings from the classifier modules.

The weightings assigned to each module may be changed at any point in time. Weightings for example may be provided for variables in order to automate a score which is indicative of major factors.

Optionally, further comprising a step of providing a user with a fact-checking tool to determine a manual score indicative of the accuracy of the at least one piece of information requiring manual verification, wherein the manual score is provided by the assistance of a human fact-checker, wherein the manual score is provided by the assistance of a human fact-checker.

The manual score complements the automated score to provide the overall verification score. The manual score relates to assessing the veracity of individual claims and statements in the input data and is a key component of the verification score.

Optionally, the manual score further comprises detection of one or more statements from the one or more pieces of information. Optionally, the manual score is provided for information comprising a statement. Optionally, the statement forms part of any one of an online post, a paragraph, an article or a full news story.

Some components of the manual score relate to verifying individual statements in the body of text. Some of these statements may be automatically verified and form part of the automated score. In some cases, a claim/statement may be complex and may not be able to be verified automatically by a fact checking method or system. Where the claims/statements contain a number of variables, and thus complex, it may need to be verified by a human expert and is deemed to be a manual score.

Optionally, the manual score further comprises comparing information to be verified against public databases or reference information. Optionally, the manual score comprises detection of one or more statements from the one or more pieces of information.

This may provide the expert fact-checkers information to compare a claim/statement against. Further, the reference information may relate to known factual information for a given topic or subject matter.

Optionally, the step of detecting one or more statements comprises semantic parsing of the one or more pieces of information.

The semantic parsing of the pieces of information to obtain statements will be automated, to obtain semantic parses. This may enable a community of fact checkers to generate training labels of correct logical forms for a given semantic parse of a claim/statement.

Optionally, the manual score further comprises at least of one: having an expert score for each human fact-checker; allocating a claim to the most suitable fact-checker; the use of machine learning to automatically gather supporting or negating arguments for each claim from the reference information or a public database; the human fact-checker providing a counter-hypothesis; the human fact-checker providing a counter-argument; the human fact-checker providing step-by-step reasoning; and providing a reasoned conclusion and/or statements for the claim being verified.

Along with providing a verification of whether or not a claim/statement is true or false, optionally an explanation as to why the claim/statement is true or false may also be provided. This can provide clarity of the final verification and gives well-reasoned justifications together with each check. This explanation as to why the claim/statement is true or false can form training data for generating an automated fact check of the statement in the future.

Optionally, the manual score is provided using a fact-checker network or platform.

The network or platform may be a peer-to-peer network or platform of experts.

Optionally, the expert score for each human fact-checker is indicative of reliability of each human fact-checker. Optionally, the expert score for each human fact-checker is determined through an analysis of one or more of: fact-checker bias; fact-checker credibility; fact-checker profile; and/or content generated by the fact-checker.

Optionally, the method comprises providing a manual score or verification indicative of the accuracy of the automated score and/or to adjust the automated score.

In this way, the method may further verify the automated content score by have a human fact-checker take a second look.

Optionally, the automated and manual scores are generated upon a weighting analysis performed based on a plurality of factors.

Optionally, the method further comprising the step of storing the verification output on a realtime content quality database.

Optionally, the real-time content database is adapted for a specific user type.

The truth score may be analysed over time for different writers, authors, domains, people, websites, etc., and be stored and presented as a credibility index.

Optionally, a combination of the automated score and a crowdsourced score generates a verification score. In some instances, a score generated from an automated verification and a score generated from a crowdsourced, or semi-automated, verification may be combined to form a truth score for a claim/statement or article.

Optionally, the verification output is present in a form suitable for an application program interface, as a graphical representation and/or as a credibility score or trust score.

According to a second aspect, there is provided a method of processing and detecting one or more pieces of information to be verified from one or more input data, the method comprising; determining which of the one or more pieces of information are to be verified automatically and which of the one or more pieces of information require manual verification.

According to a third aspect, there is provided a method of generating a verification score, the method comprises; generating a verification score which gives a measure of confidence of the accuracy of information which forms one or more input data, the verification score comprising a weighted sum one or more automated scores and one or more manual scores.

According to a fourth aspect, there is provided a method of verifying input data, comprising the steps of; receiving one or more items of input data; determining one or more pieces of information to be verified from the or each item of input data; determining which of the one or more pieces of information are to be verified automatically and which of the one or more pieces of information require manual verification; determining an automated score indicative of the accuracy of the at least one piece of information which is to be verified automatically; providing a user with a fact checking tool to determine; a first manual score indicative of the accuracy of the at least one piece of information requiring manual verification; and a second manual score indicative of the accuracy of a combination of the or each automated score; and generating a verification score which gives a measure of confidence of the accuracy of the information which forms the or each item of input data, wherein the verification score comprises; a combination of the or each automated score and the or each first manual score; or a combination of the or each automated score and the or each second manual score.

According to a fifth aspect, there is provided an apparatus operable to perform the method of any preceding feature.

According to a sixth aspect, there is provided a system operable to perform the method of any preceding feature.

According to a seventh aspect, there is provided a computer program operable to perform the method and/or apparatus and/or system of any preceding feature.

BRIEF DESCRIPTION OF THE DRAWINGS

Embodiments will now be described, by way of example only and with reference to the accompanying drawings having like-reference numerals, in which.

SPECIFIC DESCRIPTION

Embodiments will now be described with the assistance of FIGS. 1 to 5.

It is proving increasingly difficult for users to detect bias and judge for provenance and quality in content that users are exposed to. The rise of user-generated content has resulted in a considerable amount of content online being produced without fact checking standards or editorial policy, so judging conformity to such a policy is needed to empower any reader of content to judge the truth of such content. Thus, there is an unprecedented need for a truth "layer" or similar overlay on content that can identify such content as being fake, misleading or false, and then verify the claims and information made in the content itself.

Figure 1:
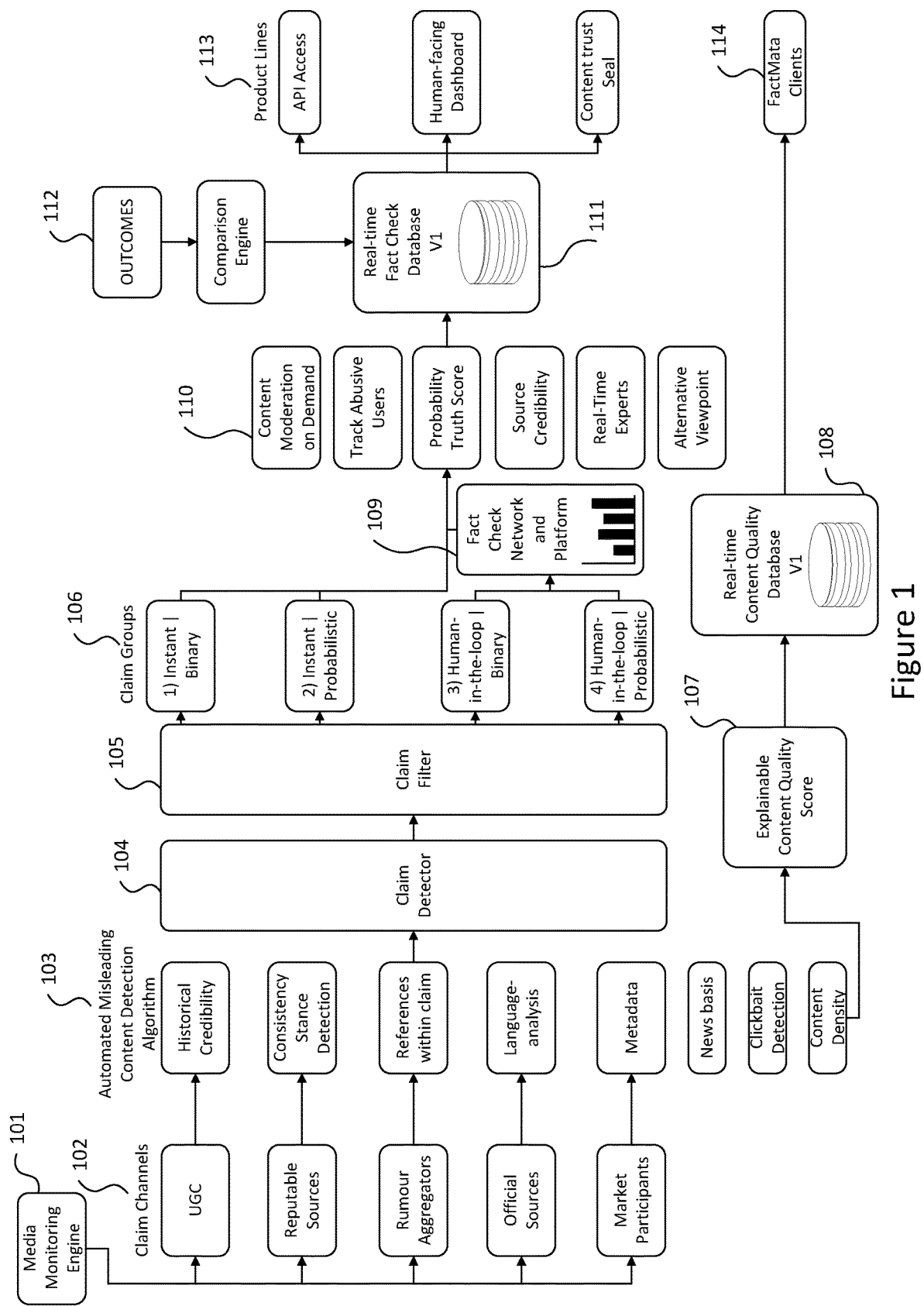
FIG. 1 illustrates a fact checking system.

Illustrating an example embodiment of a fact checking system overview is FIG. 1. FIG. 1 shows a flowchart of the fact checking system starting from a media monitoring engine 101. Media content/online information from claim channels 102 such as UGC, reputable sources, rumour aggregators, official sources and market participants are collected and input into an automated misleading content detection algorithm 103. Claim channels 102 are not limited to the specific examples aforementioned or examples detailed in Figure is and some embodiments may include content provided by other sources.

As depicted in FIG. 1, the automated misleading content algorithm/detector 103 forms the first major part of the system. This module takes in content from several media monitoring systems 101 and analyses it based on various natural language processing techniques for identifiers that it could be fake or misleading, as well as generally scoring the content for its quality. In short, these may include:

1. The original domain and IP address of the news article and whether it may be produced and distributed by a bot network based on pattern analysis, or whether it is a clear copy of a real and trusted domain with a modification.
2. Weighted classification to suspect an article, including missing citations, author names, 'about us' section, spelling errors, out of context quotes, one-sidedness, outrageousness.
3. Crowdsourced data on article trustworthiness and/or any other characteristic in relation to the content.
4. A comparison of the headline to the article body for "clickbait" detection.
5. Identification of how "clickbait" the headline is.
6. The stance of reputed news agencies to the article: support, agree, disagree, discuss, unrelated.
7. And other methods.

Figure 1A:
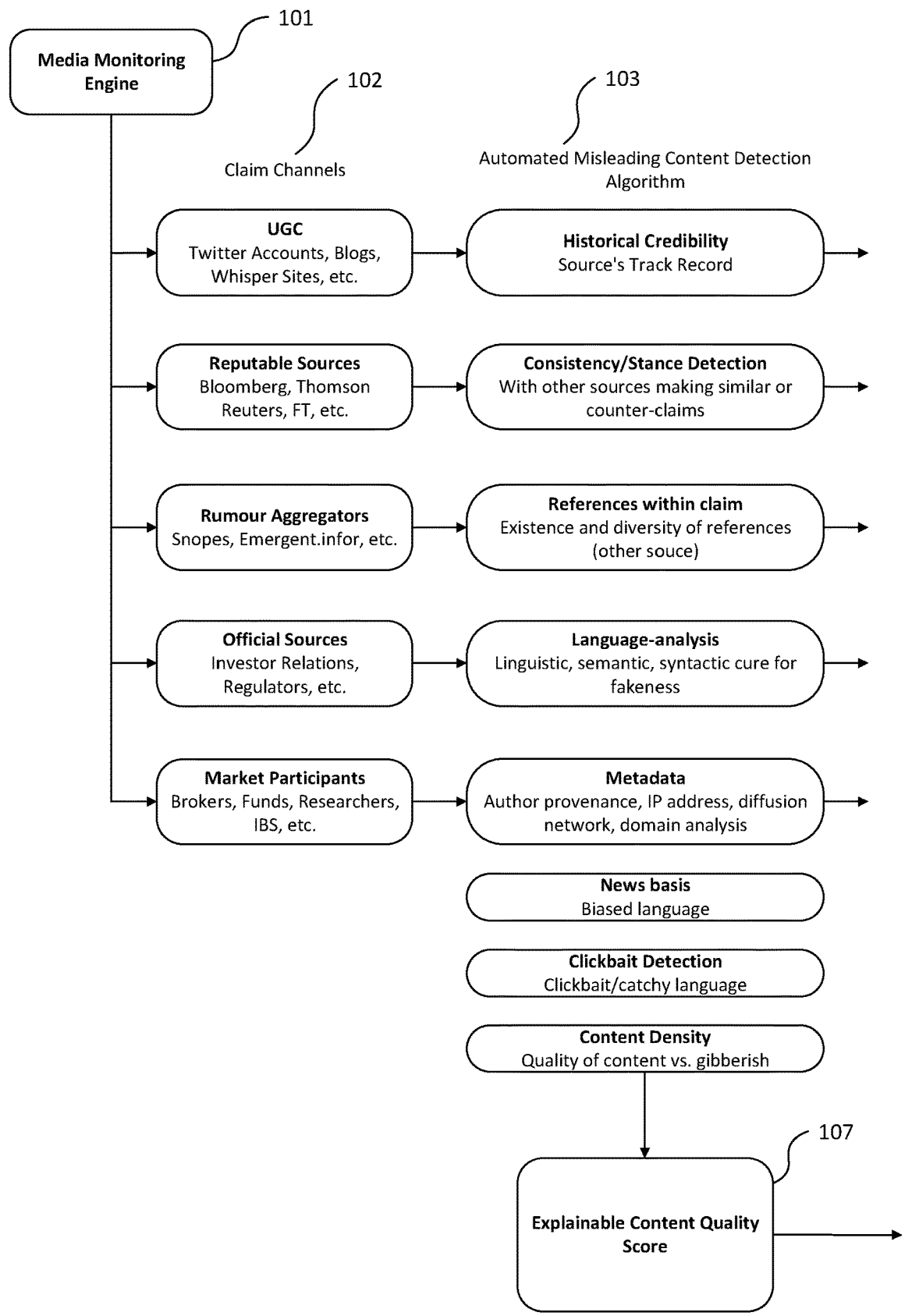
FIG. 1a is an expanded section of FIG. 1, more specifically detailing various claim channels and the automated misleading content detection algorithm.

As illustrated in FIG. 1a, the automated misleading content detection algorithm 103 consists of various analysation techniques. Namely, analysing historical credibility, consistency/stance detection, references within claims, language analysis e.g. linguistic and semantic analysis, metadata, bias, clickbait detection and content density.

Figure 5:
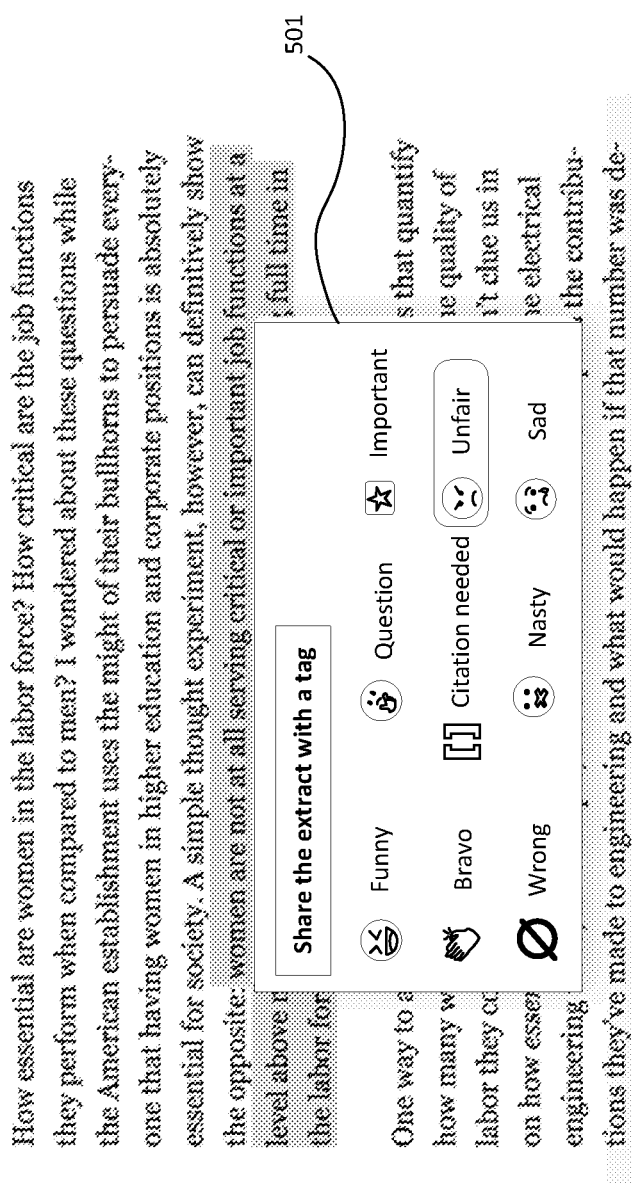
FIG. 5 shows an example of a claim tagging user interface for annotating claims.

A claim detection system may be present in a fact checking system whereby it deploys annotated claims from experts/journalists/fact-checkers. An example claim annotation system by Full Fact is shown in FIG. 5. In this example embodiment, Briefr is used. You can see a user generated "citation needed" tag which leads to the claim label as shown as 501.

The next phase is to develop a specific workflow for a citation needed tag. In order to suggest the type of claim it would require an action such as a click, a comment(s) may be inputted, and an evidence link/URL may be provided via the browser extension. In this way, the workflow process retrieves various data such as:

What is the claim;
Explanation/fact check/comment for that claim;
Evidence which would be submitted as a link for that claim; and
Counter-claim (the sentence that contradicts the claim or gives a different view of the facts), the machine may or may not extract automatically from the evidence URL, or the user may input the evidence into a text box.

Figure 1B:
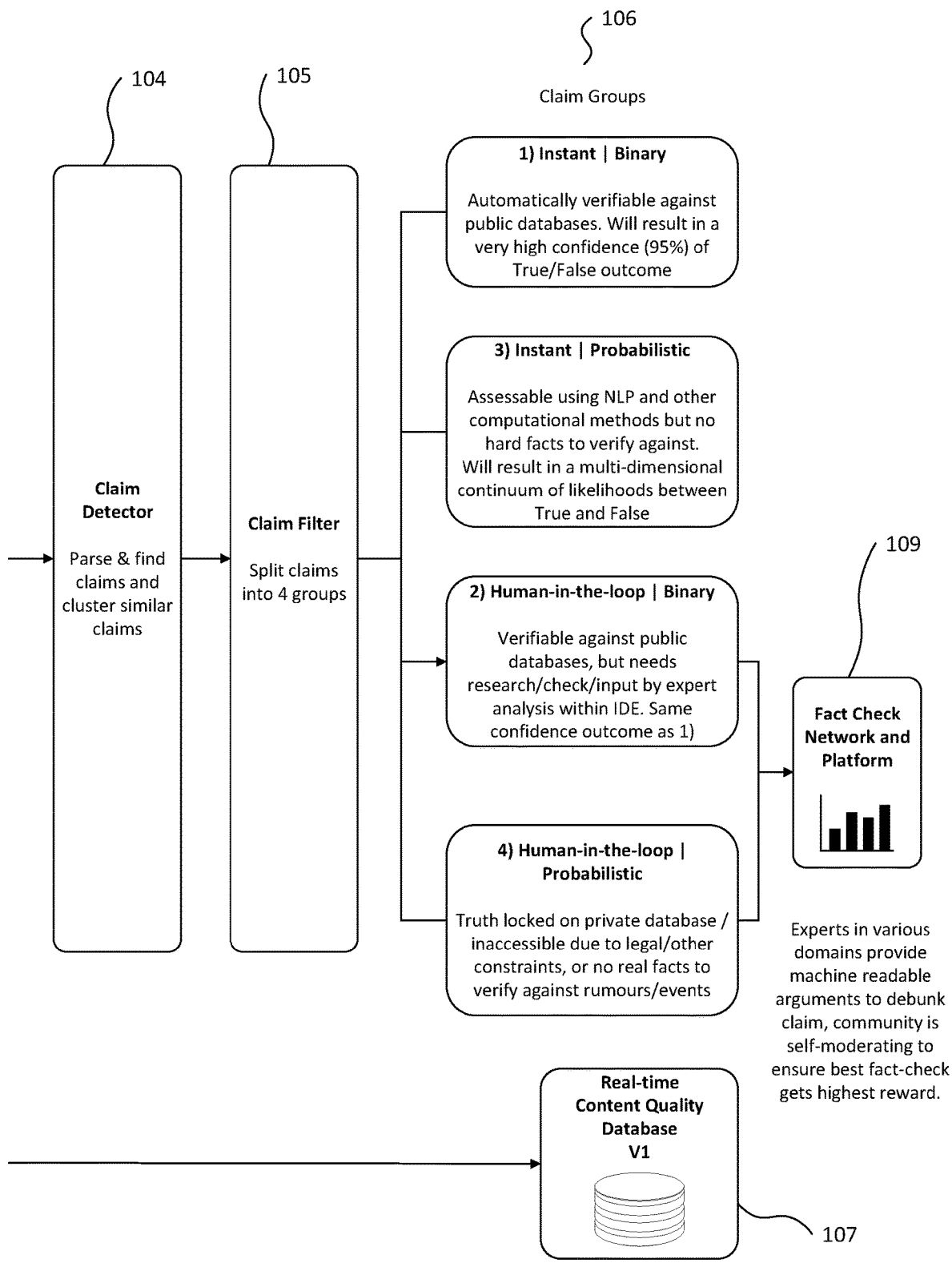
FIG. 1b is an expanded section of FIG. 1, more specifically detailing the different claim groups within the system.

In an example embodiment, a claim detector 104 may be present to detect, parse and cluster claims. A claim filter 105 may also be present which groups claims into separate categories as shown in FIG. 1b. According to at least one embodiment, in the case of a complex claim (one that the system cannot automatically verify), the assistance of a human fact checker is needed. This is referred to as humans-in-the-loop. For example, claim groups may include:

1) Instant and binary: Automatically verifiable against public databases and will result in a very high confidence true/false outcome.
2) Instant and probabilistic: Assessable using NLP and other computational methods but no hard facts to verify against. This may result in a multi-dimensional continuum of likelihoods between true and false.
3) Human-in-the-loop and binary: Verifiable against public databases but needs research/check/input by an expert analyst. The confidence outcome may be similar to that of an instant and binary claim group.

4) Human-in-the-loop and probabilistic: Truth locked on private database/inaccessible due to legal/other constraints, or no real facts to verify against rumours/event.

Content clustered into one or more human-in-the-loop claim groups can be input into a fact checking network and platform 109 where experts in various domains provide machine readable arguments in order to debunk claims. In this way, the community is self-moderating in order to ensure the best fact-check receives the highest reward. The fact checking network and platform 109 may be used for annotation purposes and may also be combined with other tools/platforms, for example a bias scoring platform.

Figure 1C:
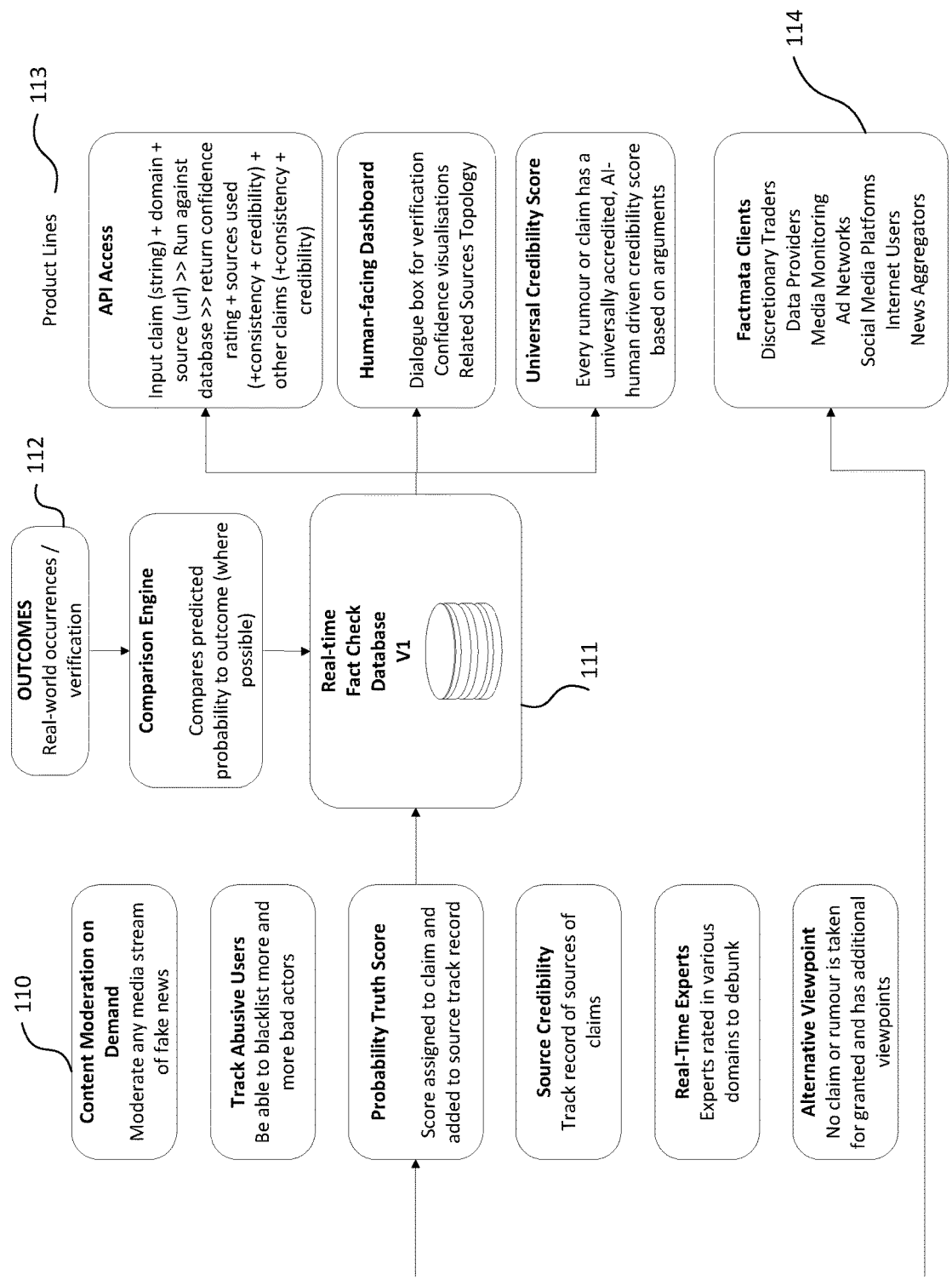
FIG. 1c is an expanded section of FIG. 1, more specifically detailing outputs of the fact checking network and platform and various product lines.

FIG. 1 also illustrates example outcomes from inputting content from various claim channels 102 to an automated misleading content detection algorithm 103, a claim detector 104 and a claim filter 105. The outcomes are more specifically described in FIG. 1c, and these include, but are not limited to, as shown as 110, the following:
1) Content moderation on demand: moderation of any media stream for fake news.
2) Tracking abusive users: The ability to blacklist more and more bad actors.
3) Determining a probability truth score: Assigning a score to a claim which may be added to a source track record.
4) Determining source credibility: Updating track records of sources of claims.
5) Annotations by real-time expert analysts: Rating provided by experts in various domains in order to debunk content.
6) Providing alternative viewpoints: No claim or rumour is taken for granted and has additional viewpoints.

Figure 2:
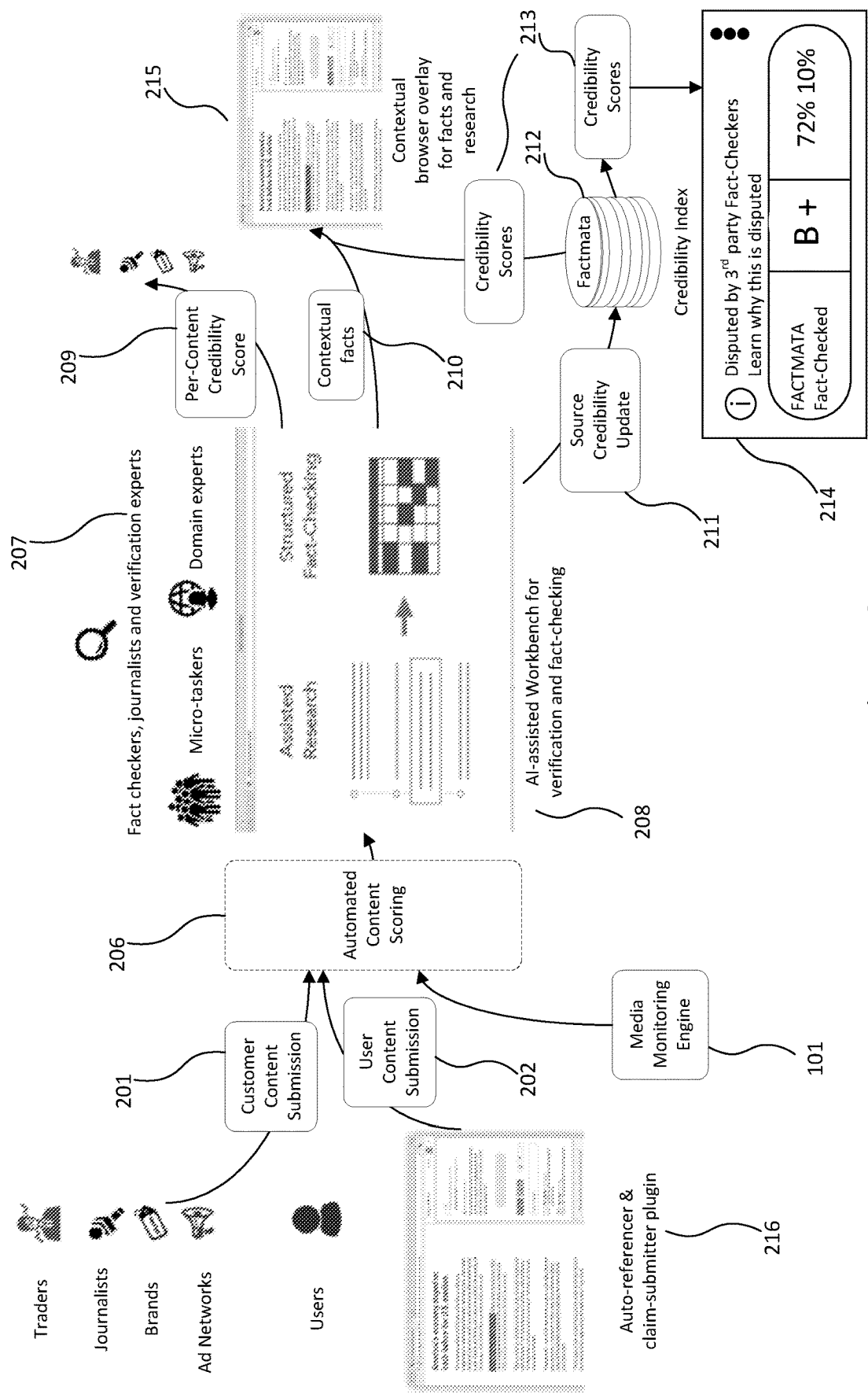
FIG. 2 illustrates an automated content scoring module of a fact checking system.

FIG. 2 depicts an "Automated Content Scoring" module 206 which produces a filtered and scored input for a network of fact checkers. Input into the automated content scoring module 206 may include customer content submissions 201 from traders, journalists, brands, ad networks user etc., user content submissions 202 from auto-reference and claim-submitter plugins 216 and content identified by the media monitoring engine 101. The content moderation network of fact checkers 207 including fact checkers, journalists, verification experts, grouped as micro taskers and domain experts, then proceeds by verifying the content as being misleading and fake through an AI-assisted workbench 208 for verification and fact-checking. The other benefit of such a system is that it provides users with an open, agreeable quality score for content. For example, it can be particularly useful for news aggregators who want to ensure they are only showing quality content but together with an explanation. Such a system may be combined with or implemented in conjunction with a quality score module or system.

This part of the system may be an integrated development environment or browser extension for human expert fact checkers to verify potentially misleading content. This part of the system is particularly useful for claims/statements that are not instantly verifiable, for example if there are no public databases to check against or the answer is too nuanced to be provided by a machine. These fact checkers, as experts in various domains, have to carry out a rigorous onboarding process, and develop reputation points for effectively moderating content and providing well thought out fact checks. The onboarding process may involve, for example, a standard questionnaire and/or based on profile assessment and/or previous manual fact checks made by the profile.

Through the AI-assisted workbench for verification and fact-checking 208, a per-content credibility score 209, contextual facts 210 and source credibility update 211 may be provided. The source credibility update may update the database 212 which generates an updated credibility score 213 and thus providing a credibility index as shown as 214 in FIG. 2. Contextual facts provided by the AI-assisted user workbench 208 and credibility scores 213 may be further provided as a contextual browser overlay for facts and research 215.

Real-time content quality and fact check databases 108 and 111 are used to store data for training algorithms as well as to determine a quality fact check and are used to enhance the system's automated fact checking capabilities. The data within the real-time content quality database may be delivered to users e.g. clients 114. On the other hand the real-time fact check database in provided to product lines 113, for example API access, human-facing dashboard and content trust seal.

In embodiments algorithms are substantially domain-adaptable, given that users may provide data from a variety of sites (social sites, news, political blog posts, lifestyle blogs, etc). For that, data is aggregated from the various sources and stratified sampling may be implemented to build the training and the test datasets. The final performance metric may be based on a test dataset that encompasses a variety of sources. In terms of process, datasets are gathered from open sources or from research papers. After carrying out error analysis, one or multiple annotation exercises are run on a sample of customer data, and which is used to re-train the model.

In terms of the data, various annotation exercises can be implemented on both crowdsourcing platforms (Crowdflower, Mechanical Turk) and other expert annotation platforms such as BriefR.

Two of the main challenges of the ML models are making sure the models are fair and up-to-date. News stories and threats keep changing every day, and it is necessary to be able to detect new content. For example, for models to be "fair" and not too biased (i.e. only detecting right-wing stories as hyperpartisan content), it is required to make sure that the training data has been collected from a balanced set of annotators which is representative from the set of views we would like to incorporate into our models. In order to achieve these two goals, a unique set of communities of experts/users will provide the human-in-the-loop in order to annotate new trending stories etc. Models may be used to identify the top toxic trending stories, which will then be given to annotators to remove false positives. Then, in order to increase the recall of classifiers within the system, data which is directly reported/flagged by our communities of experts, as well as take an unsupervised approach to find the top trending themes will be used. In some embodiments, stories/content coming from both the supervised approach and unsupervised, will be then fed to experts/annotators as a final check to get a labelled set of toxic stories. These articles/pieces of content can then be fed back into the machine learning (ML) models to re-train them as well as updating fact checks for content.

The assisted fact checking tools have key components that effectively make it a code editor for fact checking, as well as a system to build a dataset of machine readable fact checks, in a very structured fashion. This dataset will allow a machine to fact check content automatically in various domains by learning how a human being constructs a fact check, starting from a counter-hypothesis and counter-argument, an intermediate decision, a step by step reasoning, and a conclusion. Because the system can also cluster claims with different phrasings or terminology, it allows for scalability of the system as the claims are based online (global) and not based on what website the user is on, or which website the input data/claim is from. This means that across the internet, if one claim is debunked it does not have to be debunked again if it is found on another website.

In an embodiment, a user interface may be present wherein enabling visibility of labels and/or tags, which may be determined automatically or by means of manual input, to a user or a plurality of users/expert analysts. The user interface may form part of a web platform and/or a browser extension which provides users with the ability to manually label, tag and/or add description to content such as individual statements of an article and full articles.

Figure 3:
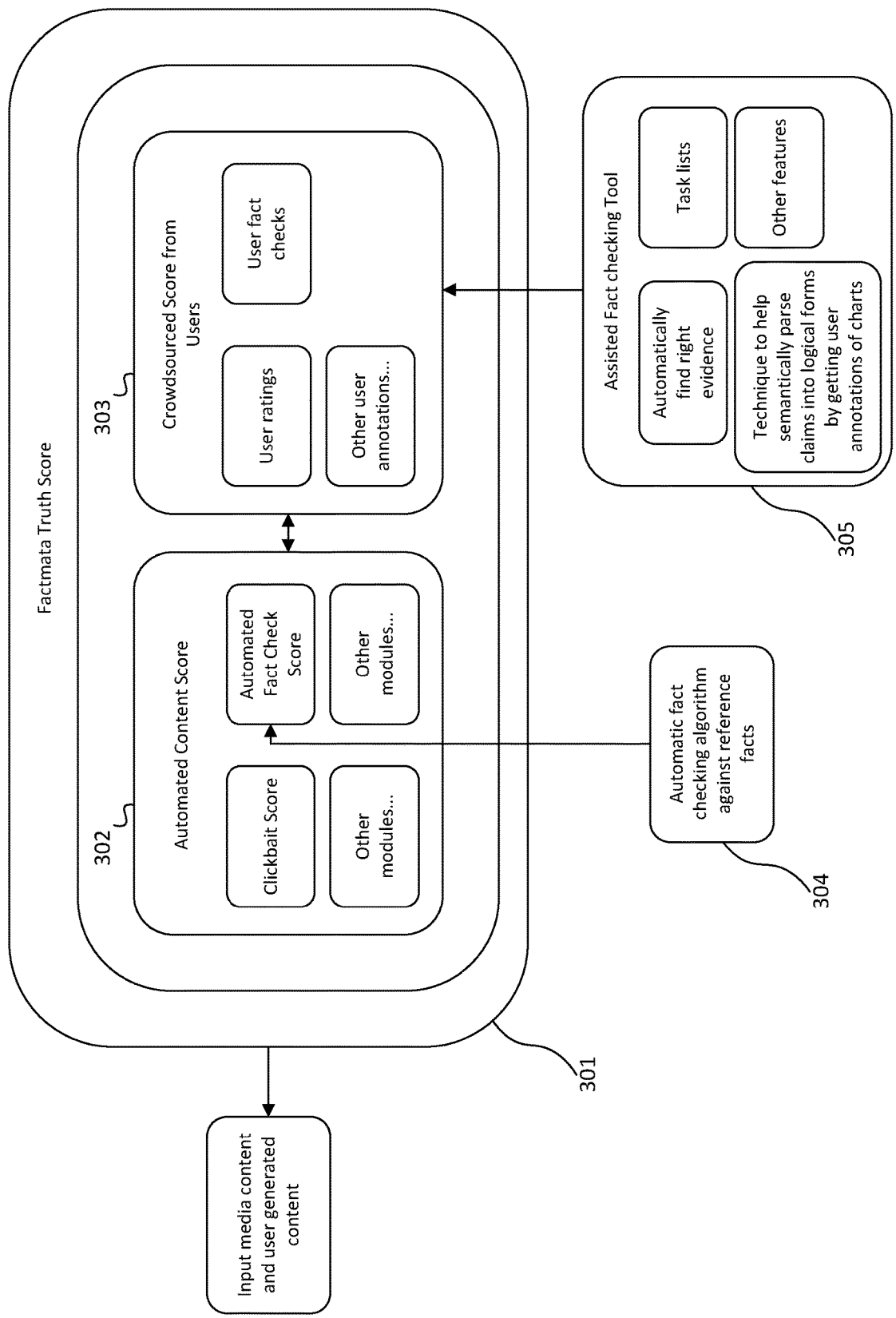
FIG. 3 illustrates a flowchart of truth score generation including both manual and automated scoring.

FIG. 3 illustrates a flowchart of truth score generation 301 including both manual and automated scoring. A combination of an automated content score 302 and a crowdsourced score 303 i.e. content scores determined by users such as expert annotators, may include a clickbait score module, an automated fact checking scoring module, other automated modules, user rating annotations, user fact checking annotations and other user annotations. In an example embodiment, the automated fact checking scoring module comprises an automatic fact checking algorithm 304 provided against reference facts. Also, users may be provided with an assisted fact checking tool/platform 305. Such tool/platform may assist a user(s) in automatically finding correct evidence, a task list, techniques to help semantically parse claims into logical forms by getting user annotations of charts for example as well as other extensive features.

Figure 4:
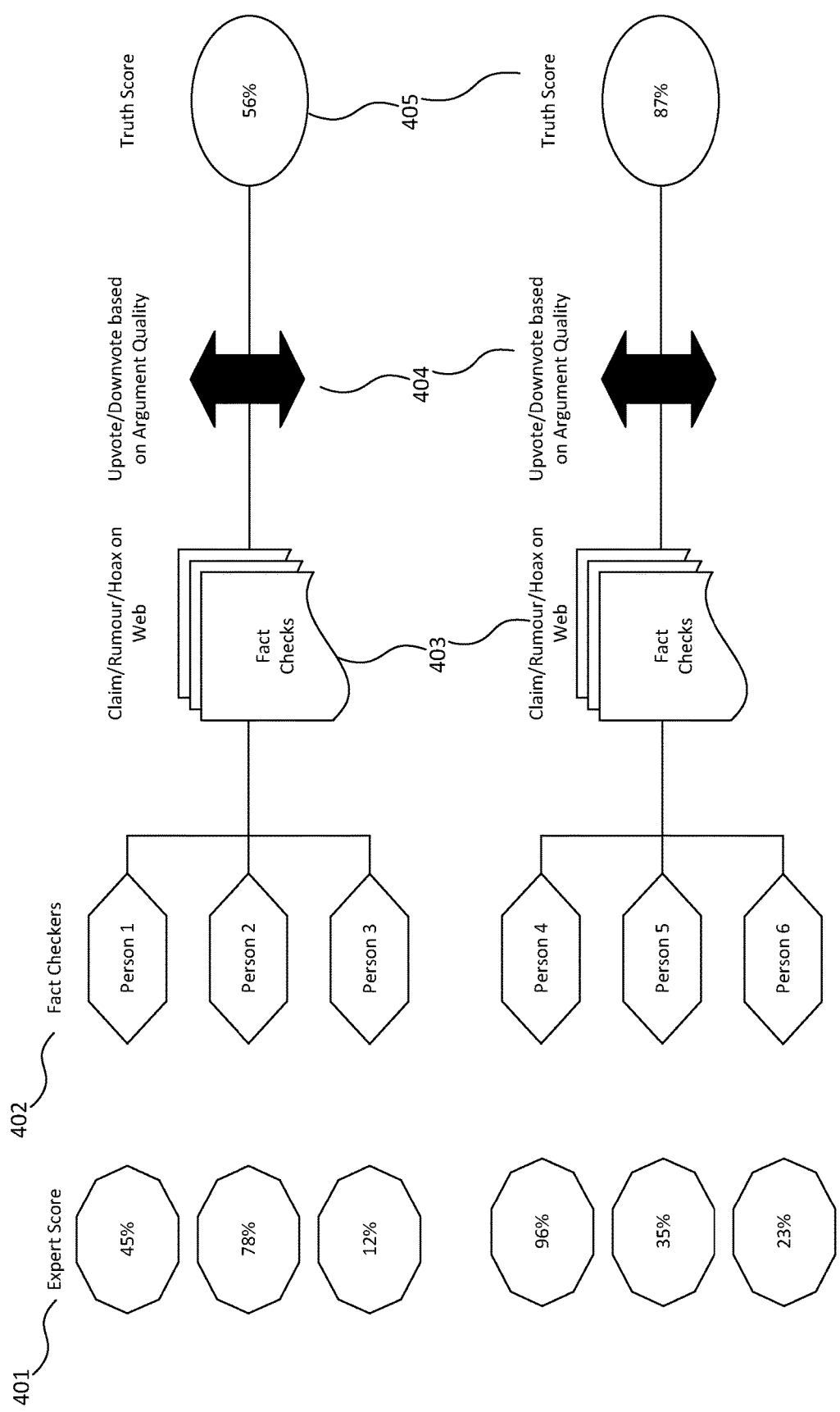
FIG. 4 illustrates the manual scoring module of a fact checking system involving human fact-checkers.

According to at least one embodiment, in the case of a complex claim (one that the system cannot automatically verify), the assistance of a human fact checker is needed. This is referred to as humans-in-the-loop. This embodiment works in the following manner and is depicted in FIG. 4:

1. Understands and documents the expertise of various fact checkers on the networks e.g. who is better than others at checking claims about economic statistics. There may be provided an expert score 401 to identify such experts.
2. Allocates the correct claim or news content to the right fact checker 402.
3. Clusters similar news pieces, rumours or claims together, as shown as 403, so there is no repetition of fact checking.
4. Generates probabilistic content scoring of claims or articles using an automated algorithm.
5. Asks the fact checker to record in a very specific way their methodology to fact check. By way of an example, this may include information such as: what were the supporting or negating sources, what is their counter-claim or hypothesis, what is the argument they put forth, what is the intermediate logic of their fact-check, and what is the conclusion or score they assign to a piece of content. The system will also incorporate machine learning to assist the fact checkers. For example, auto-correct certain claims made in the text, surface the right sources to check particular claims, automatically gather supporting or negating arguments from the web via stance detection. There may be provided upvote/downvote data based on argument quality as shown as 404.
6. Has a decision support mechanism, potentially via the blockchain, to have multiple fact-checkers confirm or support a fact-check, with different weightings assigned to each fact-checker for their expertise.
7. Produce a stamp or certificate for each piece of content.
8. As the system processes more information, the system can recognise patterns to automatically fact check particular pieces of content or produce conclusions automatically with a probabilistic degree of likelihood and produce a truth score 405.

This embodiment provides reasoning as to why the content is misleading and provides some information to the fact checker network to indicate why this content has been flagged, as opposed to providing the information with no context as to what is to be checked. In this way, the system may provide an explainable aspect to the assessed or fact-checked information. In FIG. 1, there is illustrated an explainable content quality score 107.

Importantly, the weights of the automated content scores may be adjusted. For example, "clickbait" refers to a method of obtaining an interest from a user in an article, generally using a sensationalist or highly exaggerated headline. A user clicks on what appears to be a very interesting or informative article, which, usually, does not live up to expectations. The terms "clickbaitedness" or "how clickbait (is this)" may refer to a level/quality of or resemblance to "clickbait" detected as part/in of an article. A semi-automated or 'assisted' fact-checking arrangement involving human checking methods to assign the same score to content, may be provided. Such a semi-automated arrangement may include any of the preceding algorithmic methods, and/or one or more of:

1. How many claims are referenced in the article with a link;
2. How many claims are fact-checked as true vs. unverified claims; and/or
3. How many claims are from first hand, secondary or tertiary sources and how many claims are sourced from somewhere else.

Thus, if the expert fact checker believes that "clickbaitedness" is a more accurate indicator of what is to be flagged to their content moderation network to enhance recall of misleading content, this weighting factor of the automated content score may be increased accordingly. This embodiment includes some elements of explainable machine learning where it can explain and account for its reasoning of fact checking.

This system and method is significantly cheaper and faster than having individual teams of fact-checkers, because it harnesses knowledge and wisdom of the crowd to self-correct and manage. The system is configured to allocate work segments efficiently amongst a network as opposed to being unallocated. The system may also provide different weightings to different people implicitly in order to fact check different content based on their expertise, to make conflict resolution faster than Wikipedia (for example) and in order to reach conclusions more quickly. Also, the platform may take in any form of content, even videos, and is not limited to one network (e.g. Wikipedia articles).

The fact-checking expert network may explicitly encourage experts in different fields to correct the claims and databases. The best fact checks on the platform get upvoted by other experts and/or the public and thus people are encouraged to write better quality arguments. This enables a real-time, on demand network of the top minds or experts in certain fields to be built, in order to dispel rumours and mistruths about things.

Another potential benefit of some embodiments providing such a platform can be that users have the ability to see opinions on things that are far beyond their 'filter bubbles' (that is to say what they may not usually see) on social media platforms. People associated with both sides of a story may have the ability to fact check a rumour or claim, and only the rumour with the best argument 'wins' in terms of being able to fact-check a statement with evidence. In this way, producers of the content in question are motivated and encouraged to create higher quality content.

The system may also pick up potential fake news, rumours and hoaxes faster than other systems, to achieve close to a real-time solution. This is because content is fed into the network in real-time rather than when the rumour or news has picked up attention or popularity. The system may be combined or implemented in conjunction with other systems or methods for determining, for example, bias such as hyper-partisanship, content and/or author credibility and/or contentiousness within content. The system may further be integrated to provide an explanation and be provided as part of an annotation platform which may be taken into account within annotator profiles. In an example embodiment, there may be provided a web based method, systems and algorithms which determine automatically and/or semi-automatically the level of bias/hyper-partisanship and/or scores in relation to credibility/truthfulness.

Due to the ability to perform claim clustering and rumour similarity techniques, if a web rumour is available on a website and is the same as the check that has been done on a different website, the system can blanket the web with the fact checks for a particular rumour and combine them, rather than having an expert network start from scratch in their checks.

By using machine learning techniques, the system will slowly start to assist and aid human fact-checker networks to check things faster and more efficiently across the web, because it will start to record how humans do the same task so that a machine can start to help in this very time consuming and complex process.

This semi-automated system for fact-checking and content scoring can be available for use for multiple industries and use cases, including:

1. Hedge funds who want to verify signals they see in news as being real vs. fake, and have a reliability score to them.
2. Platforms such as Facebook or Google that need to clean up their networks of fake news.
3. News aggregators and any platforms that host links that need to provide their users with accurate news feeds.
4. Advertising network inventory owners who own link inventories for advertisers to advertise on and want to ensure all content is clean and can reflect brand image.

Another set of algorithms and/or similar technology may be used to automatically assist a fact-checking network with their fact checking process of verifying individual claims/statements, which may lead to a crowdsourced score. Such assistance may include one or more of:

detecting assertions, rumours and/or claims in bodies of text using machine learning methods (which may include neural networks), the said assertions, rumours, and/or claims requiring fact-checking;

helping a user find reference sources against which to fact-check (which, for example, may include a claim about economic growth presented alongside a link to a World Bank data source, against which to check, with the correct country and date filled in); splitting media data into clusters of viewpoints, and for the same story, stories that are for or against a target individual or claim in nature;

assessing the provenance of the headline, including who was the original reporter of the story, for example a Tweeter or the Associated Press;

starting to provide, automatically, a task list for a fact checker for any given claim or rumour, in terms of the steps to take to check it which may be different based upon the content of the claim;

providing alternative sources for each topic in the body of an article, and additional context including graphics, further reading and so on;

assessing how much text has been copied from another article that is already known about;

assessing information about the author and/or persons identified in the story;

identifying quotations which have been misquoted from their original quotes in source material;

providing a button for a fact-checker to open, automatically, a set of tabs on their browser pre-searched with the key terms;

providing a fact checker with a chart or table from a factual source appropriate to the fact they should be checking;

Providing a fact checker with the correct link to visit to fact check content; and/or allowing a fact checker to score the content from 1-10.

Providing an indication or score based on other systems such as bias, hyperpartisan and contentiousness etc.

In these ways, a score may effectively be crowdsourced.

Machine learning is the field of study where a computer or computers learn to perform classes of tasks using the feedback generated from the experience or data gathered that the machine learning process acquires during computer performance of those tasks.

Typically, machine learning can be broadly classed as supervised and unsupervised approaches, although there are particular approaches such as reinforcement learning and semi-supervised learning which have special rules, techniques and/or approaches.

Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and typically uses unlabelled data sets. Reinforcement learning is concerned with enabling a computer or computers to interact with a dynamic environment, for example when playing a game or driving a vehicle.

Various hybrids of these categories are possible, such as "semi-supervised" machine learning where a training data set has only been partially labelled. For unsupervised machine learning, there is a range of possible applications such as, for example, the application of computer vision techniques to image processing or video enhancement. Unsupervised machine learning is typically applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to highdimensional data sets, or using k-means clustering to cluster data by a measure of the Euclidean distance between each datum).

Semi-supervised learning is typically applied to solve problems where there is a partially labelled data set, for example where only a subset of the data is labelled. Semi-supervised machine learning makes use of externally provided labels and objective functions as well as any implicit data relationships. When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values without providing too many features (which can result in too many dimensions being considered by the machine learning process during training, and could also mean that the machine learning process does not converge to good solutions for all or specific examples). The user must also determine the desired structure of the learned or generalised function, for example whether to use support vector machines or decision trees.

The use of unsupervised or semi-supervised machine learning approaches are sometimes used when labelled data is not readily available, or where the system generates new labelled data from unknown data given some initial seed labels.

Machine learning may be performed through the use of one or more of: a non-linear hierarchical algorithm; neural network; convolutional neural network; recurrent neural network; long short-term memory network; multi-dimensional convolutional network; a memory network; or a gated recurrent network allows a flexible approach when generating the predicted block of visual data. The use of an algorithm with a memory unit such as a long short-term memory network (LSTM), a memory network or a gated recurrent network can keep the state of the predicted blocks from motion compensation processes performed on the same original input frame. The use of these networks can improve computational efficiency and also improve temporal consistency in the motion compensation process across a number of frames, as the algorithm maintains some sort of state or memory of the changes in motion. This can additionally result in a reduction of error rates.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

I claim:

1. A method of verifying input data, the method comprising:
   receiving one or more items of input data;
   determining one or more pieces of information to be verified from the one or more items of the input data;
   determining a first set of pieces of the one or more pieces of information that are to be verified automatically and a second set of pieces of the one or more pieces of information that are to be verified by manual verification;
   determining an automated score indicative of an accuracy of at least one of the first set of pieces of information which are to be verified automatically;
   providing a user with a fact-checking tool to determine a manual score indicative of the accuracy of the second set of pieces of information to be verified by manual verification, wherein the fact-checking tool is configured to find correct evidence for the second set of pieces of information and to present a task list for a human fact-checker to check the second set of pieces of information, wherein the manual score is provided by assistance of the human fact-checker; and
   generating a combined verification score which gives a measure of confidence of the accuracy of the information which forms the one or more items of the input data.

2. The method of claim 1, wherein the receiving the one or more items of the input data comprises at least one of:
   automatically identifying the input data to be verified;
   receiving a manual submission of information to be verified by a user; and
   obtaining reference information from one or more information channels.

3. The method of claim 2, wherein the reference information is gathered in dependence upon the one or more pieces of information to be verified.

4. The method of claim 1, further comprising using natural language processing techniques.

5. The method of claim 1, wherein the automated score is determined for information comprising any one of: a sentence, a paragraph, an article or a full news story.

6. The method of claim 1, wherein providing the automated score comprises using at least one classifier module to identify fake or misleading content.

7. The method of claim 6, wherein the at least one classifier module comprise at least one of:
   a clickbait detection module;
   a stance detection module; or
   content-density module.

8. The method of claim 1, wherein the automated score comprises using natural language processing or other computational methods to provide a probabilistic score.

9. The method of claim 1, wherein the automated score is generated in accordance with weightings from classifier modules.

10. The method of claim 1, wherein the manual score is provided for information comprising a statement, wherein the statement forms part of any one of an online post, a paragraph, an article or a full news story.

11. The method of claim 1, wherein the determining of the manual score comprises comparing information to be verified against public databases or reference information.

12. The method of claim 1, wherein the determining of the manual score comprises detecting one or more statements from the one or more pieces of information.

13. The method of claim 12, wherein the detecting of the one or more statements comprises semantic parsing of the one or more pieces of information.

14. The method of claim 1, wherein the determining of the manual score comprises at least one of:
accessing an expert score for each human fact-checker;
allocating a claim to a most suitable fact-checker based on an accessed expert score of the most suitable fact-checker;
using machine learning to automatically gather supporting or negating arguments for the claim from reference information or a public database;
receiving from the human fact-checker a counter-hypothesis for the claim;
receiving from the human fact-checker a counter-argument for the claim;
receiving from the human fact-checker step-by-step reasoning for the claim;
or
providing a reasoned conclusion or statements for the claim.

15. The method of claim 14, wherein the expert score for each human fact-checker is indicative of reliability of each human fact-checker.

16. The method of claim 14, wherein the expert score for each human fact-checker is determined through an analysis of one or more of: fact-checker bias; fact-checker credibility; fact-checker profile; or content generated by the human fact-checker.

17. The method of claim 1, further comprising storing the combined verification score on a real-time content quality database.

18. The method of claim 17, wherein the real-time content quality database is adapted for a specific user type.

19. A method of verifying input data, the method comprising:
receiving one or more items of input data;
determining one or more pieces of information to be verified from the one or more items of the input data;
determining which of the one or more pieces of information are to be verified automatically and which of the one or more pieces of information are to be verified by manual verification;
determining an automated score indicative of an accuracy of at least one of the one or more pieces of information which is to be verified automatically;
providing a user with a fact checking tool to determine:
a first manual score indicative of the accuracy of the at least one of the one or more pieces of information requiring manual verification; and
a second manual score indicative of the accuracy of a combination of each automated score, wherein the fact-checking tool is configured to find correct evidence for the at least one of the one or more pieces of information and to present a task list for a human fact-checker to check the at least one of the one or more pieces of information, wherein the first manual score is provided by assistance of the human fact-checker; and
generating a verification score which gives a measure of confidence of the accuracy of the at least one piece of information wherein the verification score comprises a combination of the automated score and the first manual score or a combination of the automated score and the or each second manual score.

* * * * *